United States Patent [19]

Faulkner

[11] Patent Number: 5,165,514

[45] Date of Patent: Nov. 24, 1992

[54] CONVEYOR FLIGHT ASSEMBLY

[76] Inventor: William G. Faulkner, 6608 Edgebrook, Oklahoma City, Okla. 73132

[21] Appl. No.: 832,181

[22] Filed: Feb. 6, 1992

[51] Int. Cl.$^5$ .............................................. B65G 1/00
[52] U.S. Cl. ................ 198/347.3; 198/690.2; 198/699.1; 198/801
[58] Field of Search ............. 198/347.3, 690.2, 699.1, 198/801, 853

[56] References Cited

U.S. PATENT DOCUMENTS

| | | | |
|---|---|---|---|
| 2,884,935 | 5/1959 | Fox | 198/699.1 |
| 3,349,893 | 10/1967 | Jordan et al. | 198/690.2 |
| 4,213,527 | 7/1980 | Lapeyre et al. | 198/853 |
| 4,729,469 | 3/1988 | Lapeyre et al. | 198/853 |
| 4,832,183 | 5/1989 | Lapeyre | 198/690.2 |
| 4,989,718 | 2/1991 | Steeber | 198/347.3 |
| 5,020,656 | 6/1991 | Faulkner | 198/853 |

FOREIGN PATENT DOCUMENTS

415791  9/1934  United Kingdom ............. 198/699.1

Primary Examiner—Joseph E. Valenza
Attorney, Agent, or Firm—Dunlap, Codding & Lee

[57] ABSTRACT

A flight assembly for use in a conveyor wherein the flight assembly includes at least two flight links. The two flight links are removably connected in an end to end relationship for maintaining an alignment between the forward faces and the rearward faces of the two flight links. In one embodiment, a plurality of flight assemblies are incorporated in a take-away conveyor. In one other embodiment, each flight link has an angled portion and a curved portion formed on each of the first and second ends thereof for permitting articles to slide over the forward faces and the rearward faces of the flight links without engaging one of the ends of the flight projections in a manner disturbing such sliding movement.

34 Claims, 4 Drawing Sheets

CONVEYOR FLIGHT ASSEMBLY

FIELD OF THE INVENTION

The present invention relates to flight links for use in a conveyor wherein the flight links are connected to maintain an alignment between forward faces and rearward faces of the flight links during the operation of the conveyor. In addition, the present invention also contemplates flight links having curved ends to permit articles to slide over the forward faces and the rearward faces of the flight links without engaging one of the ends of the flight links thereby disturbing such sliding movement.

BRIEF DESCRIPTION OF THE DRAWINGS

FIG. 6 is a view similar to FIG. 4 showing a plurality of modified flight links with only a fragment of two of the flight links being shown in FIG. 6.

DESCRIPTION OF THE PREFERRED EMBODIMENTS

Figure 1:
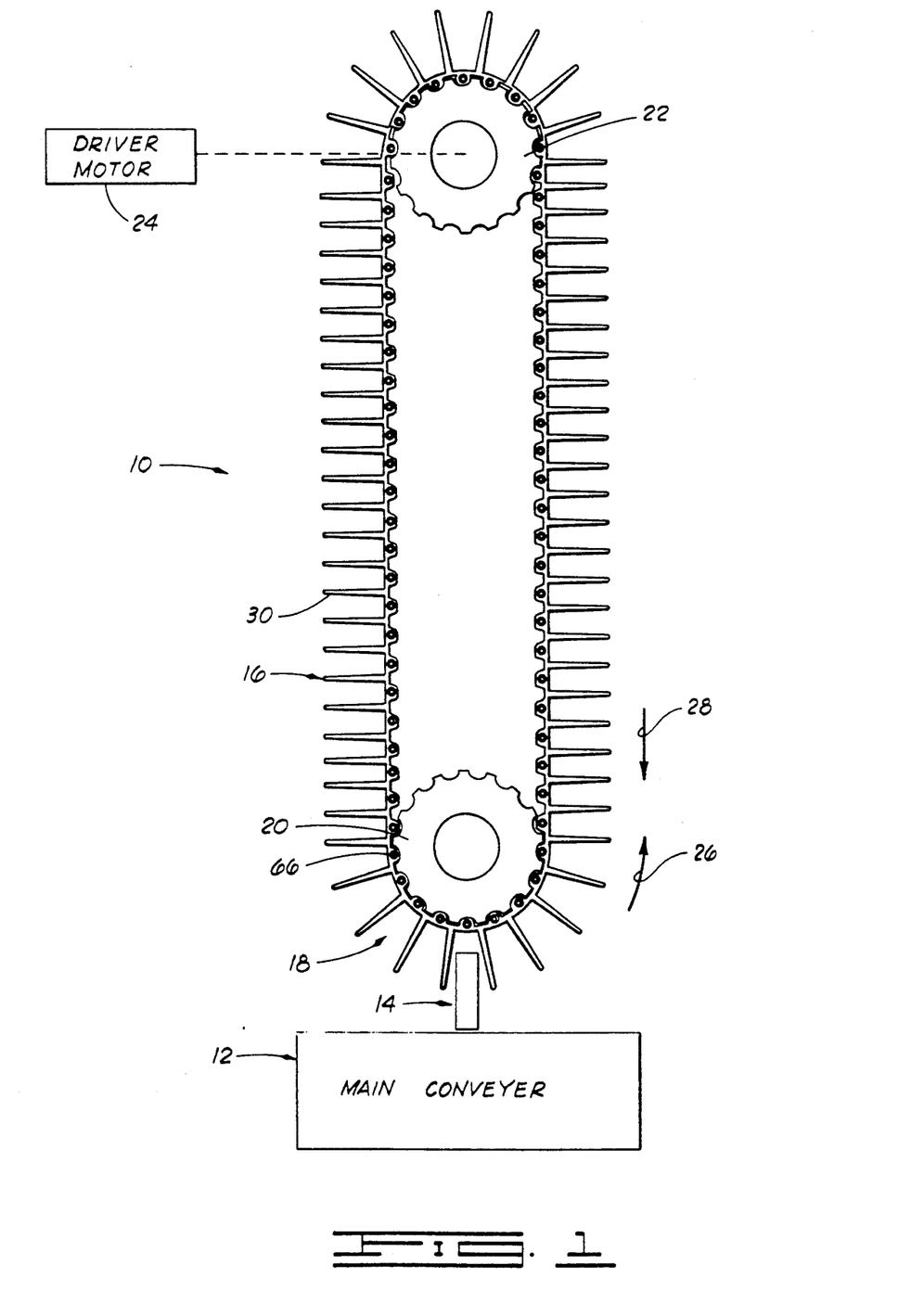
FIG. 1 is a side elevational view of a take-away conveyor disposed over a main conveyor with the main conveyor being diagrammatically illustrated in FIG. 1.
Figure 2:
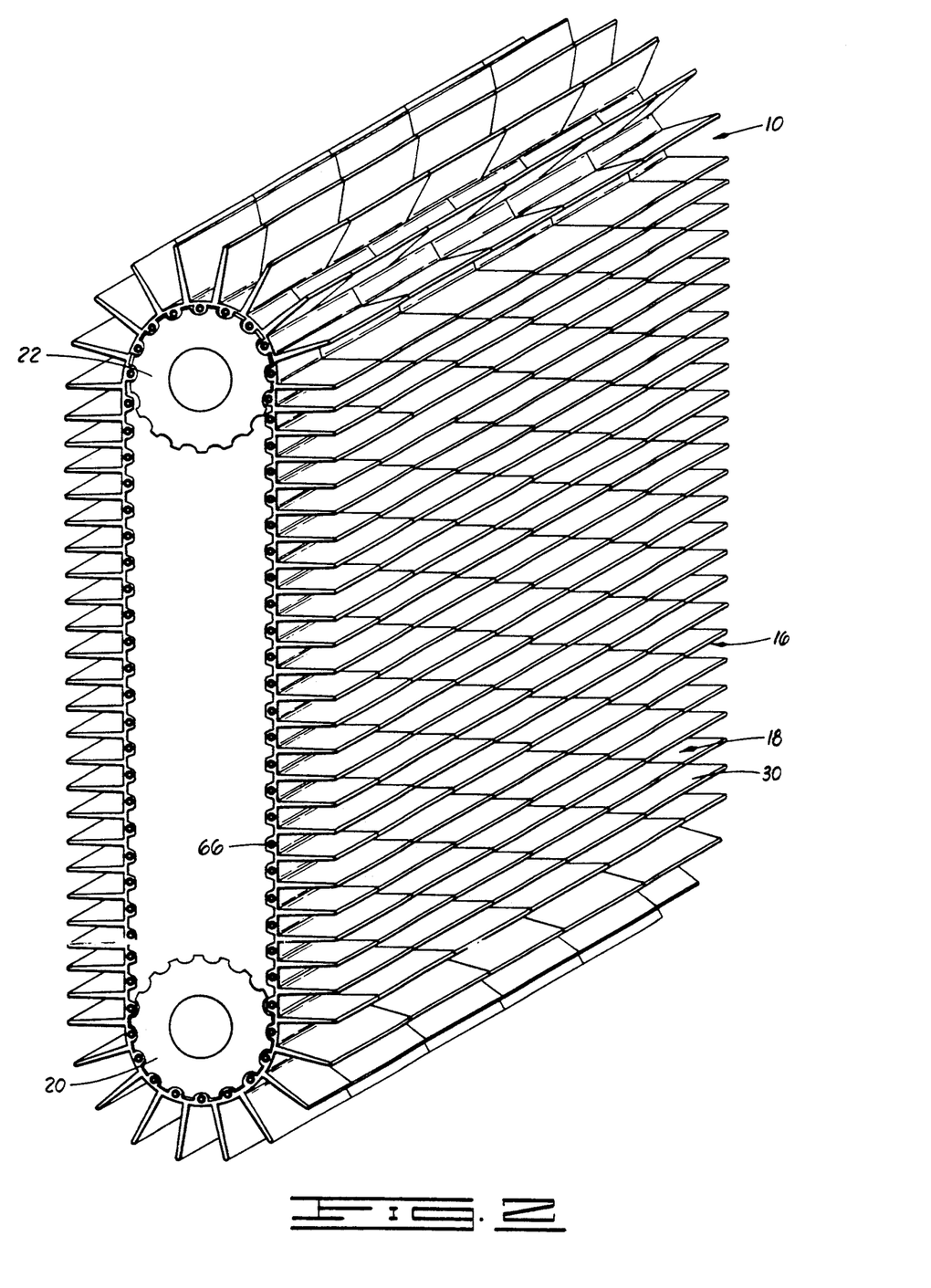
FIG. 2 is a perspective view of the take-away conveyor of FIG. 1.

Shown in FIGS. 1 and 2 and designated by the reference numeral 10 is a take-up conveyor operatively disposed above a main conveyor 12, the main conveyor 12 being diagrammatically shown in FIG. 1. The main conveyor 12 may have any one of several different constructions and is adapted for conveying articles with an article being shown diagrammatically in FIG. 1 and designated therein by the reference numeral 12. Conveyors for conveying articles such as the main conveyor 12 are well known in the art and a detailed description of the construction and operation of such conveyors is not deemed necessary herein.

The take-up conveyor 10 is adapted to lift articles from the main conveyor 12 and to dispose articles back onto the main conveyor 12. The take-away conveyor 10 includes a plurality of flight assemblies 16 (only one of the flight assemblies 16 being designated by a reference numeral in FIGS. 1 and 2). Each of the flight assemblies 16 are identical in construction. Each flight assembly 16 is spaced a distance from an adjacent flight assembly 16 forming a channel 18 disposed between each pair of adjacent flight assemblies 16 (only one channel 18 being designated with a reference numeral in FIGS. 1 and 2).

The take-away conveyor 10 includes a plurality of idler sprockets 20 (only one idler sprocket being shown in FIGS. 1 and 2) and a plurality of drive sprockets 22 (only one of the drive sprocket 22 being shown in FIGS. 1 and 2). The drive sprockets 22 are connected to a driver 24 (diagrammatically shown in FIG. 1 and labeled "Driver Motor") which may be a motor for example. The idler sprockets 20 and the drive sprockets 22 support the take-away conveyor 10 above the main conveyor 12 and drivingly move the take-away conveyor 10 in a direction 26 (FIG. 1) or direction 28 (FIG. 1).

The driver 24 rotates the take-up conveyor 10 in the direction 26 or 28 for rotating the flight assemblies 16 to sequentially dispose each of the channels 18 over the main conveyor 12 in alignment for receiving articles such as the article 14 on the main conveyor 12 or to dispose articles such as the article 14 back onto the main conveyor 12. The take-up conveyor 10 is shown in FIG. 1 with one article 14 being disposed in one of the channels 18 with that channel 18 being aligned with the main conveyor 12 for receiving the article 14. In practice, a plurality of articles are disposed in each of the channels and the take-up conveyor 10 is rotated in the direction 26 or 28 to positions whereby the flight assemblies 16 engage the articles 14 and support the articles 14 as the take-up conveyor 10 is rotated to remove the articles 14 from the main conveyor 12 or to dispose the articles 14 back onto the main conveyor 12.

Figure 3:
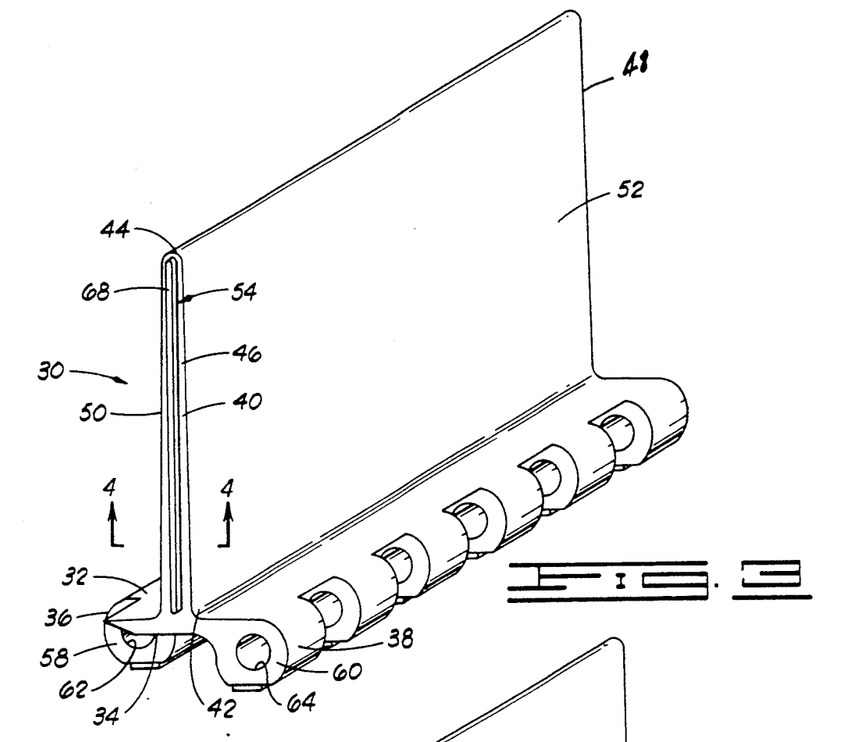
FIG. 3 is a perspective view of a typical flight link used in the take-away conveyor of FIGS. 1 and 2.
Figure 4:
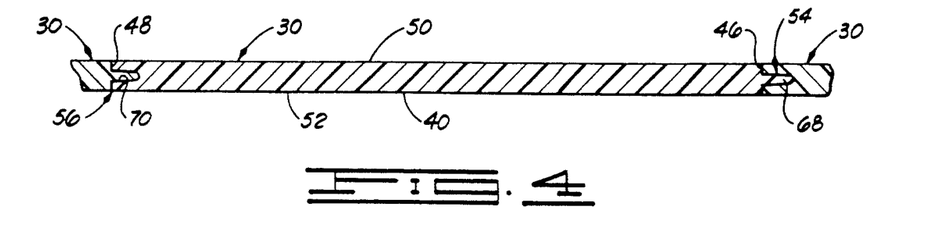
FIG. 4 is a sectional view of a plurality of interconnected flight links (three flight links being shown in FIG. 4 with only a fragment of two of the flight links being shown in FIG. 4) with each of the flight inks being constructed like the flight link shown in FIG. 3.
Figure 5:
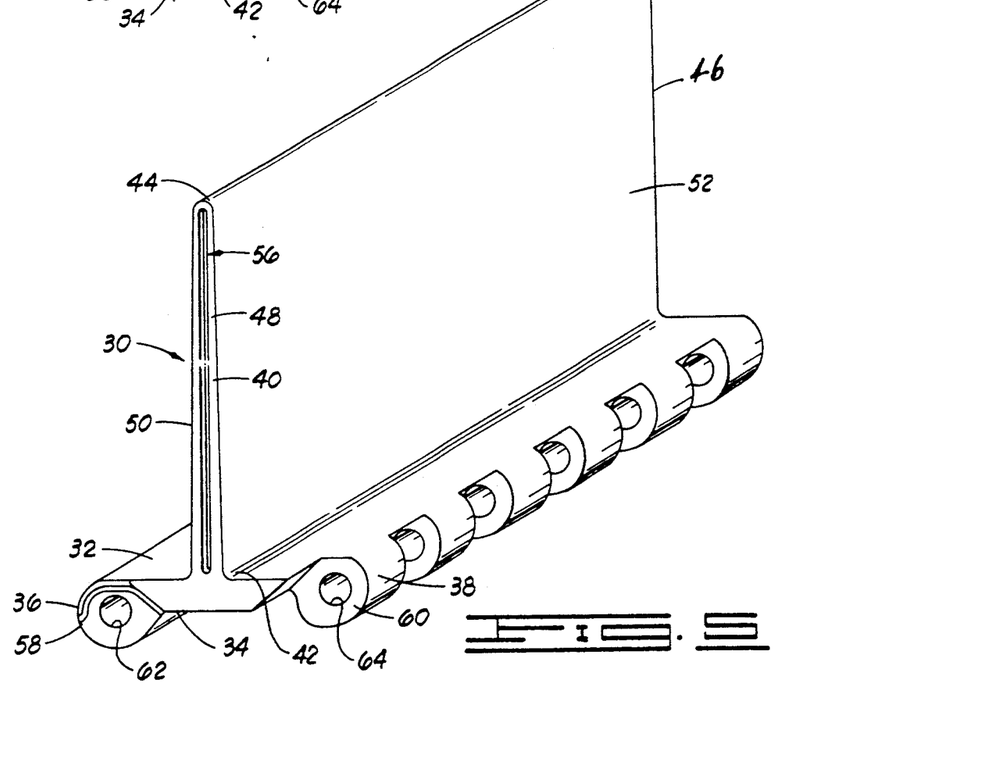
FIG. 5 is a perspective view of the typical flight link of FIGS. 3 and 4, showing the end opposite the end shown in FIG. 3.

Each flight assembly 16 includes a plurality of flight links 30 (FIGS. 3, 4 and 5). Each of the flight links 30 is identical in construction. Each flight link 30 has an upper surface 32, a lower surface 34, a forward end 36 and a rearward end 38.

A flight projection 40 is formed on each of the flight links 30. A lower end 42 of the flight projection 40 is disposed adjacent the upper surface 32 of the flight link 30 and each flight projection 40 extends a distance upwardly from the upper surface 32 of the flight link 30 terminating with an upper end 44. Each flight projection 40 has a first end 46 forming the first end of the flight link 30, a second end 48 forming the second end of the flight link 30, a forward face 50 and a rearward face 52. A first end connector 54 is formed on the first end 46 of each flight projection 40 and a second end connector 56 is formed on the second end 48 of each flight projection 40.

A plurality of spaced apart forward shaft projection 58 are formed on the forward end 36 of each of the flight links 30. A plurality of spaced apart rearward shaft projections 60 are formed on the rearward end 38 of each of the flight links 30. A shaft opening 62 is formed through each of the forward shaft projections 58. A shaft opening 64 is formed through each of the rearward shaft projections 60.

In operation, a plurality of flight links 30 are placed in an end to end relationship with the first end 46 of each of the flight projections 40 being disposed adjacent the second end 48 of an adjacent flight projection 40, although it should be noted that the flight links 30 at each end of the flight assembly 16 will have either a first end 46 or second end 48 which is not disposed adjacent the first end 46 or the second end 48 of another flight projection 40. In this position, the first end connector 54 of each flight link 30 is removably connected to the second end connector 56 of an adjacent flight link 30 for interconnecting the flight links 30 in each of the flight assemblies 16 in a position wherein the forward faces 50 of the flight projections 40 in one flight assembly 16 are aligned and the rearward faces 52 of the flight projections 40 and that same flight assembly 16 also are aligned. The connection formed between adjacent flight links 30 by the first and the second end connectors 54 and 56 cooperate to maintained the substantial alignment of the forward faces 50 and the rearward faces 52 in each of the flight assemblies 16.

Each of the flight assemblies 16 is connected to an adjacent flight assembly 16 by moving the flight links 30 in one flight assembly 16 toward the flight links 30 in an adjacent flight assembly 16 to a position wherein the forward shaft projections 58 on the flight links 30 in one of the flight assemblies 16 are interleaved in the rearward shaft projections 60 on the flight links 30 in the adjacent flight assembly 16. In this position, a shaft 66 is disposed through the aligned shaft openings 62 and 64 to interconnect the flight links 30 in one of the flight assemblies 16 to the flight links 30 and the adjacent flight assembly 16 (only one of the shafts 66 being designated by a reference numeral in FIGS. 1 and 2).

It should be noted that a link assembly could be interposed between adjacent flight assemblies 16 and, in this embodiment, the flight links 30 in each of the flight assemblies 16 would be connected to one end of the link assembly and the flight links 30 in the adjacent flight assembly 16 would be connected to the opposite end of the link assembly. In this last mentioned embodiment, the forward shaft projections 58 on the flight links 30 in each of the flight assemblies 16 still are considered to be directly connected to the rearward shaft projections 60 on the flight links 30 in the adjacent flight assemblies 16 even though a link assembly is interposed therebetween.

Shown more clearly in FIGS. 3 and 4, the first end connectors 54 each comprise a tip 68 formed on the first end 46 of each flight projection 40. The tip 68 extends a distance outwardly from the first end 46 and each tip 68 extends a distance generally between the lower end 42 and the upper end 44 of the flight projection 40.

As shown more clearly in FIGS. 4 and 5, the second end connectors 56 each comprise a slot 70 formed on the second end 56 of each of the flight projections 40. Each slot 70 extends a distance into the second end 48 of each of the flight projections 40. Each slot 70 extends a distance between the lower end 42 and the upper end 44 of each flight projection 40. The slot 70 is slightly smaller than the tip 68 so that the tip 68 must be forced fitted or snapped into the slot 70.

In operation, the first end 46 of one of the flight projections 40 is positioned adjacent the second end 48 of an adjacent flight projection 40 and, in this position, the tip 68 on one of the flight projections 40 is snappingly disposed in or forced fitted into the slot 70 thereby interconnecting the two adjacent flight links 30.

EMBODIMENT OF FIG. 6

Shown in FIG. 6 is a plurality of flight links 30a which are constructed exactly like the flight links 30 described before, except each of the flight links 30a includes a modified first end connector 54a and a modified second end connector 56a.

Each first end connector 54a includes a tip 68a which has a bead 72 formed on the outer most end thereof. The bead 72 preferably extends between the upper end 42 and the lower end 44 of the flight projections 40.

Each of the modified second end connectors 56a includes a slot 70a which has a bead recess 74 formed on an innermost end thereof. The bead recess 74 intersects the respective slot 70a.

In operation, one of the flight links 30a is positioned adjacent one of the other flight links 30a in a position wherein the first end 46a of the flight link 30a is adjacent the second end 48a of the adjacent flight link 30a. In this position, the tip 68a with the bead 72 thereon is forced through the slot 70 to a position wherein the bead 72 is snappingly disposed in the bead recess 74 to interconnect the two adjacent link assemblies. In the alternative, one of the flight links 30a is positioned above the adjacent flight link 30a with the tip 68a on the one of the flight links 30a being disposed above the slot 70a formed in the adjacent flight link 30a and the bead 72 on one of the flight links 30a being disposed above and aligned with the bead recess 74 on the adjacent flight link 30a. In this position, the flight link 30a is moved downwardly slidingly disposing the tip 68a in the slot 70a and the bead 72 in the bead recess 74.

Figure 7:
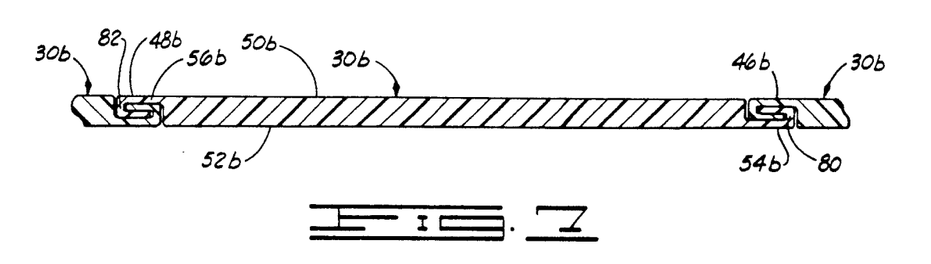
FIG. 7 is a view similar to FIG. 4, but showing a plurality of other modified flight links with only a fragment of two of the flight links being shown in FIG. 7.

EMBODIMENT OF FIG. 7

Shown in FIG. 7 is a plurality of flight links 30b which are constructed exactly like the flight links 30 shown in FIGS. 1, 2, 3, 4 and 5 and described in detail before, except the flight links 30b each include a modified first end connector 54b and a modified second end connector 56b.

Each modified first end connector 54b includes a U-shaped hook 80. Each modified second end connector 56b includes a U-shaped hook 82.

In operation, one of the flight links 30 is positioned above an adjacent flight links 30 with the U-shaped hook 80 on one of the flight links 30 being disposed above and aligned with the U-shaped 82 on the adjacent flight links 30. In this position, the flight links 30b is lowered and, as the flight links 30b is lowered the U-shaped hook 80 is slidingly interlocked with the U-shaped hook 82 on the adjacent flight links 30b for interconnecting the adjacent flight links 30b.

Figure 8:
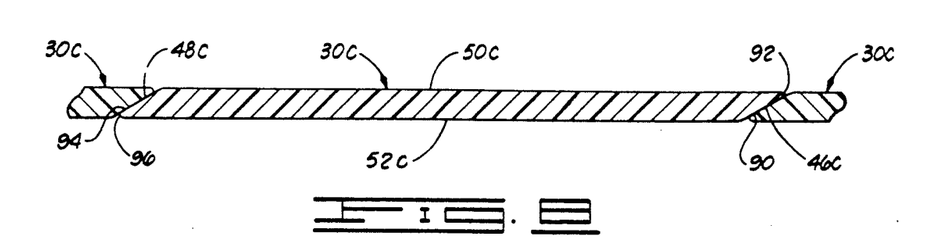
FIG. 8 is a view similar to FIG. 4, but showing a plurality of still other modified flight links with only a fragment of two of the flight links being shown in FIG. 8.

EMBODIMENT OF FIG. 8

Shown in FIG. 8 is a plurality of flight links 30c which are constructed exactly like the flight links 30 shown in FIGS. 1, 2, 3, 4 and 5 and described in detail before, except the flight links 30c do not include first and second end connectors like the first and second end connectors 54 and 56 described before. Rather, the first end 46c of each of the flight links 30 is formed on an angle to provide an angled portion 90 and one end of the angled portion 90 is curved to form a curved portion 92 and the second end 48c of each of the flight links 30c is angled to form an angled portion 94 with one end of the angled portion 94 being formed on a curve to form a curved portion 96.

In this instance, the flight links 30c can become misaligned (positioned where the forward faces 50c and the rearward faces 52c are not respectively aligned) during the operation of the conveyor or take-away conveyor. However, since the flight links 30c include the angled portions 90 and 94 and the curved portions 92 and 96, any such misalignment will not disrupt the sliding movement of any article over the forward faces 50c or the rearward faces 52c because the articles will not engage a portion of any flat perpendicularly extending edge.

It should be noted that the flight links described herein are not limited to being used in a take-away conveyor like the take-away conveyor 10 described in detail before. Rather, the flight links 30 can be used in any conveyor system such as the conveyor disclosed in copending application U.S. Ser. No. 660,977, entitled, FLAT TOP CONVEYOR, filed, Feb. 26, 1991, which description is incorporated herein by reference.

Changes may be made in the construction and the operation of the various components, elements and assemblies described herein and without departing from the spirit and scope of the invention as defined in the following claims.

What is claimed is:

1. A flight assembly comprising:
a first flight link and a second flight link, each flight link having an upper surface, a lower surface, a forward end and a rearward end, each flight link including a flight projection having a lower end disposed adjacent the upper surface with the flight projection extending a distance upwardly from the upper surface of the flight link terminating with an upper end, each flight projection having a first end forming the first end of the respective first and second flight links, a second end forming the second end of the respective first and second flight links, a forward face and a rearward face, a first end connector being formed on the first end of the first flight link, the first end of one of the first flight link being disposed adjacent the second end of the second flight link and the first end connector being removably connected to the second end of the second flight link with the forward faces of the two flight links being substantially aligned and the rearward faces of the two flight links being substantially aligned and the connection between the first end of the first flight link to the second end of the second flight link provided by the first end connector cooperating to maintain the substantial alignment of the forward faces and the rearward faces of the two flight links.

2. The flight assembly of claim 1 wherein the second flight link further comprises:
a second end connector formed on the second end of the second flight link, and wherein the first end connector on the first flight link is defined further as being removably connected to the second end connector on the second flight link for removably connecting the first end of the first flight link to the second end of the second flight link.

3. The flight assembly of claim 2 wherein the first end connector is defined further as being a tip formed on the first end of the first flight link, and wherein the second end connector is defined further as being a slot formed in the second end of the second flight link, the tip on the first flight link being disposable in the slot in the second flight link for connecting the first and second flight links.

4. The flight assembly of claim 3 wherein the tip is defined further as being snappingly disposed in the slot.

5. The flight assembly of claim 3 wherein the tip is defined further as being force fitted into the slot.

6. The flight assembly of claim 3 wherein the tip is defined further as extending a distance outwardly from the first end of the first flight link, and wherein each tip is defined further as extending a distance between the upper end and the lower end of the flight projection on the first flight link, as wherein the slot is defined further as extending a distance inwardly into the second end of the second flight link and extending between the upper and the lower ends of the first projection on the second flight links.

7. The flight assembly of claim 6 further comprising a bead formed on the end of the tip and a bead recess formed in the first projection on the second flight link with a portion of the bead recess intersecting the slot, the tip being disposed in the slot and the bead being disposed in the bead recess in a connected position of the first and second flight links.

8. The flight assembly of claim 7 wherein the bead is defined further as being snappingly disposed in the bead recess.

9. The flight assembly of claim 2 wherein the first end connector is defined further as being a U-shaped hook, and wherein the second end connector is defined further as being a U-shaped hook, the U-shaped hook of the first end connector being interlocked with the U-shaped hook of the second end connector in a connected position of the first and second flight links.

10. A flight assembly comprising:
a first flight link and a second flight link, each of the first and the second flight links having an upper surface, a lower surface, a forward end and a rearward end, and each of the first and the second flight links having a flight projection having a lower end disposed adjacent the upper surface of the respective first and second flight links and each flight projection extending a distance upwardly from the upper surface of the respective first and second flight links terminating with an upper end, each flight projection formed on the respective first and second flight links having a first end forming the first end of the respective first and second flight link, a second end forming the second end of the respective first and second flight links, a forward face and a rearward face, a first end connector being formed on the first end of each flight projection and a second end connector being formed on the second end of each flight projection, the first end of the first flight link being disposed adjacent the second end of the second flight link and the first end connector of the first flight link being removably connected to the second end connector of the second flight link for removably connecting the first flight link to the second flight link with the forward faces of the first and the second flight links being substantially aligned and the rearward faces of the first and the second flight links being substantially aligned, the connection between the first and the second flight links formed by the first and the second end connectors cooperating to maintain the substantially alignment of the forward faces and the rearward faces of the first and the second flight links.

11. The flight assembly of claim 10 wherein each first end connector is defined further as comprising a tip formed on the first end of each of the first and the second flight links, and wherein each second end connector is defined further as being a slot formed in the second end of each of the first and the second flight links, the tip on the first flight link being disposable in the slot in the second flight link.

12. The flight assembly of claim 11 wherein the tip is defined further as being snappingly disposed in the slot.

13. The flight assembly of claim 11 wherein the tip is defined further as being force fitted into the slot.

14. The flight assembly of claim 11 wherein each tip is defined further as extending a distance outwardly from the first end of the respective first and second flight links, and extending between the upper end and the lower end of the respective first and second flight links, and wherein each slot is defined further as extending a distance inwardly into the second end of the respective first and the second flight links and extending between the upper end and the lower end of flight projection on the respective first and the second flight links.

15. The flight assembly of claim 14 wherein each first end connector further comprises a bead formed on the end of each tip of each respective first and second flight links, and wherein each second connector further comprises a bead recess formed in the second end of each respective first and second flight links with a portion of the bead recess intersecting the slot, the tip on the first flight link being disposed in the slot in the second flight link and the knob on the first flight link being disposed in the knob recess and the second flight link.

16. The flight assembly of claim 15 wherein the bead on the first flight link is defined further as being snappingly disposed in the bead recess in the second flight recess.

17. The flight assembly of claim 10 wherein each first end connector is defined further as being a U-shaped hook, and wherein each second end connector is defined further as being a U-shaped hook, the U-shaped hook of the first end connector on the first flight link being interlocked with the U-shaped hook of the second end connector on the second flight link in a connected position of the two flight links.

18. A take-away conveyor for lifting articles from a main conveyor and for disposing articles back onto the main conveyor wherein the take-up conveyor is disposed above the main conveyor, the take-up conveyor comprising:
a plurality of flight assemblies, each flight assembly being spaced a distance from an adjacent flight assembly forming a channel between each pair of adjacent flight assemblies, each channel being sized to receive articles disposed on the main conveyor and the flight assembly supporting the articles as the take-up conveyor is rotated to remove articles from the main conveyor or to dispose articles onto the main conveyor, each flight assembly comprising:
a first flight link and a second flight link, each flight link having an upper surface, a lower surface, a forward end and a rearward end, each flight link including a flight projection having a lower end disposed adjacent the upper surface with the flight projection extending a distance upwardly from the upper surface of the flight link terminating with an upper end, each flight projection having a first end forming the first end of the respective first and second flight links, a second end forming the second end of the respective first and second flight links, a forward face and a rearward face, a first end connector being formed on the first end of the first flight link, the first end of one of the first flight link being disposed adjacent the second end of the second flight link and the first end connector being removably connected to the second end of the second flight link with the forward faces of the two flight links being substantially aligned and the rearward faces of the two flight links being substantially aligned and the connection between the first end of the first flight link to the second end of the second flight link provided by the first end connector cooperating to maintain the substantial alignment of the forward faces and the rearward faces of the two flight links; and
means for rotating the flight assemblies for sequentially disposing each of the channels over the main conveyor in alignment for receiving articles on the main conveyor or disposing articles back onto the main conveyor.

19. The take-away conveyor of claim 18 wherein the second flight link further comprises:
a second end connector formed on the second end of the second flight link, and wherein the first end connector on the first flight link is defined further as being removably connected to the second end connector on the second flight link for removably connecting the first end of the first flight link to the second end of the second flight link.

20. The take-away conveyor of claim 19 wherein the first end connector is defined further as being a tip formed on the first end of the first flight link, and wherein the second end connector is defined further as being a slot formed in the second end of the second flight link, the tip on the first flight link being disposable in the slot in the second flight link for connecting the first and second flight links.

21. The take-away conveyor of claim 20 wherein the tip is defined further as being snappingly disposed in the slot.

22. The take-away conveyor of claim 20 wherein the tip is defined further as being force fitted into the slot.

23. The take-away conveyor of claim 20 wherein the tip is defined further as extending a distance outwardly from the first end of the first flight link, and wherein each tip is defined further as extending a distance between the upper end and the lower end of the flight projection on the first flight link, as wherein the slot is defined further as extending a distance inwardly into the second end of the second flight link and extending between the upper and the lower ends of the first projection on the second flight link.

24. The take-away conveyor of claim 23 further comprising a bead formed on the end of the tip and a bead recess formed in the first projection on the second flight link with a portion of the bead recess intersecting the slot, the tip being disposed in the slot and the bead being disposed in the bead recess in a connected position of the first and second flight links.

25. The take-away conveyor of claim 24 wherein the bead is defined further as being snappingly disposed in the bead recess.

26. The take-away conveyor of claim 19 wherein the first end connector is defined further as being a U-shaped hook, and wherein the second end connector is defined further as being a U-shaped hook, the U-shaped hook of the first end connector being interlocked with the U-shaped hook of the second end connector in a connected position of the first and second flight links.

27. A take-up conveyor for lifting articles from a main conveyor and for disposing articles back onto the main conveyor wherein the take-up conveyor is disposed above the main conveyor, the take-up conveyor comprising:
a first flight link and a second flight link, each of the first and the second flight links having an upper surface, a lower surface, a forward end and a rearward end, and each of the first and the second flight links having a flight projection having a lower end disposed adjacent the upper surface of the respective first and second flight links and each flight projection extending a distance upwardly from the upper surface of the respective first and second flight links terminating with an upper end, each flight projection formed on the respective first and second flight links having a first end forming the first end of the respective first and second flight link, a second end forming the second end of the respective first and second flight links, a forward face and a rearward face, and a first end connector being formed on the first end of each flight projection and a second end connector being formed on the second end of each flight projection, the first end of the first flight link being disposed adjacent the second end of the second flight link and the first end connector of the first flight link being removably connected to the second end connector of the second flight link for removably connecting the first flight link to the second flight link with the forward faces of the first and the second flight links being substantially aligned and the rearward faces of the first and the second flight links being substantially aligned, the connection between the first and the second flight links formed by the first and the second end connectors cooperating to maintain the substantially alignment of the forward faces and the rearward faces of the first and the second flight links.

28. The take-up conveyor of claim 27 wherein each first end connector is defined further as comprising a tip formed on the first end of each of the first and the second flight links, and wherein each second end connector is defined further as being a slot formed in the second end of each of the first and the second flight links, the tip on the first flight link being disposable in the slot in the second flight link.

29. The take-up conveyor of claim 29 wherein the tip is defined further as being snappingly disposed in the slot.

30. The take-up conveyor of claim 28 wherein the tip is defined further as being force fitted into the slot.

31. The take-up conveyor of claim 28 wherein each tip is defined further as extending a distance outwardly from the first end of the respective first and second flight links, and extending between the upper end and the lower end of the respective first and second flight links, and wherein each slot is defined further as extending a distance inwardly into the second end of the respective first and the second flight links and extending between the upper end and the lower end of flight projection on the respective first and the second flight links.

32. The take-up conveyor of claim 28 wherein each first end connector further comprises a bead formed on the end of each tip of each respective first and second flight links, and wherein each second connector further comprises a bead recess formed in the second end of each respective first and second flight links with a portion of the bead recess intersecting the slot, the tip on the first flight link being disposed in the slot in the second flight link and the knob on the first flight link being disposed in the knob recess and the second flight link.

33. The take-up conveyor of claim 32 wherein the bead is defined further as being snappingly disposed in the bead recess.

34. A flight assembly comprising:
a first and a second flight link, each first and second flight link having an upper surface, a lower surface, a forward end and a rearward end, each first and second flight link having a flight projection having a lower end disposed adjacent the upper surface of the flight link and each projection extending a distance upwardly from the upper surface terminating with an upper end, each flight projection having first end forming the first end of the flight link and a second end forming the second end of the flight link, a forward face and a rearward face, the first end of each flight link being formed on an angle thereby forming an angled portion and a portion of the first end being curved to form a curved portion and the second end of each flight link being formed on an angle to form an angled portion and a portion of the angled portion being curved to form a curved portion, the first and the second flight link being positioned with the first end of the first flight link being disposed adjacent the second end of the second flight link whereby the angled portions and the curved portions on the first and the second ends cooperate to permit articles to slidingly move over the forward faces and the rearward faces of the first and the second flight links without engaging the first end or the second end of the first and the second flight links in a manner disturbing such sliding movement even when the forward faces and the rearward faces of the first and the second flight links are misaligned.

* * * * *

UNITED STATES PATENT AND TRADEMARK OFFICE
CERTIFICATE OF CORRECTION

PATENT NO.  : 5,165,514
DATED       : November 24, 1992
INVENTOR(S) : William G. Faulkner It is certified that error appears in the above-identified patent and that said Letters Patent is hereby corrected as shown below:

Column 5, line 26, after the word of, please delete the words "one of".

Column 6, line 34, please delete the word "link" and substitute therefore the word --links--.

Column 6, line 52, please delete the word "substantially" and substitute therefore the word --substantial--.

Column 7, line 6, after the word and, please delete the word "the".

Column 7, line 8, after the word and, please delete the word "the".

Column 7, Line 19, after the word recess, please delete the word "and" and substitute therefore the word --in--.

UNITED STATES PATENT AND TRADEMARK OFFICE
CERTIFICATE OF CORRECTION

PATENT NO. : 5,165,514
DATED : November 24, 1992
INVENTOR(S) : William G. Faulkner It is certified that error appears in the above-identified patent and that said Letters Patent is hereby corrected as shown below:

Column 7, line 61, after the word of, please delete the words "one of".

Column 9, line 10, please delete the word "link" and substitute therefore the word --links--.

Column 9, line 28, please delete the word "substantially" and substitute therefore the word --substantial--.

Column 10, line 24, after the word having, please insert --a--.

Signed and Sealed this

Nineteenth Day of October, 1993

Attest:

BRUCE LEHMAN

Attesting Officer     Commissioner of Patents and Trademarks